United States Patent [19]
Itoh

[11] 4,443,068
[45] Apr. 17, 1984

[54] REFLECTING TELEPHOTO ZOOM LENS SYSTEM

[75] Inventor: Takayuki Itoh, Saitama, Japan

[73] Assignee: Asahi Kogaku Kogyo Kabushiki Kaisha, Tokyo, Japan

[21] Appl. No.: 295,236

[22] Filed: Aug. 21, 1981

[30] Foreign Application Priority Data

Aug. 30, 1980 [JP] Japan ............... 55-119922

[51] Int. Cl.$^3$ .................. G02B 15/14; G02B 17/08
[52] U.S. Cl. ........................... 350/423; 350/444
[58] Field of Search ............ 350/444, 442, 423, 427

[56] References Cited

U.S. PATENT DOCUMENTS

4,264,136  4/1981  Ogino ............................ 350/444
4,278,330  7/1981  Buchroeder .................. 350/442 X

FOREIGN PATENT DOCUMENTS

53-87727  8/1978  Japan ........................... 350/423
852302  10/1960  United Kingdom ....... 350/423

Primary Examiner—John K. Corbin
Assistant Examiner—Scott J. Sugarman

[57] ABSTRACT

A zoom lens system has a first set of lenses having a positive focal length and a second set of lenses having a negative focal length. The first set of lenses which is located closer to the object than the second set constitutes a reflecting system, while the second set of lenses constitutes a transmission lens system.

6 Claims, 9 Drawing Figures

REFLECTING TELEPHOTO ZOOM LENS SYSTEM

DESCRIPTION OF THE INVENTION

The invention relates to a zoom lens system and in particular to a zoom lens system using two sets of lenses to provide a zoom lens system which is very compact in contruction, and can correct chromatic aberration effectively by employing a reflecting lens system in the zoom lens system.

All of the known zoom lens systems comprising two sets of lenses have been of the retrofocus type which covers a wide angle by arranging a first set of lenses with a negative focal length and a second set of lenses with a positive focal length. It has been considered theoretically feasible to obtain a zoom lens in which a first set of lenses is arranged with a positive focal length and a second set of lenses with a negative focal length. This concept has, however, not been realized in a lens system having an iris diaphragm provided therein, since the second set of lenses has a high degree of magnification, and the lenses, particularly of the second set, are required to be displaced over a great distance. The past failure to realize a zoom lens system having a first set of lenses arranged with a positive focal length and a second set of lenses with a negative focal length is also apparently due to the problem of maintaining compact construction of the lens in the long focus mode where the first and second sets of lenses have a minimum distance therebetween.

It is an object of this invention to overcome the problems in the prior art and, in particular, to provide a zoom lens system having a first set of lenses with a positive focal length and a second set of lenses with a negative focal length.

It is another object of this invention to provide a zoom lens system in which a first set of lenses having a positive focal length constitutes a reflecting lens system whereby it is possible to eliminate any iris diaphragm and render the lens system compact in construction.

These and other objects and features of the invention will best be understood with reference to the following detailed description taken in conjunction with the drawings, of which:

Figure 1:
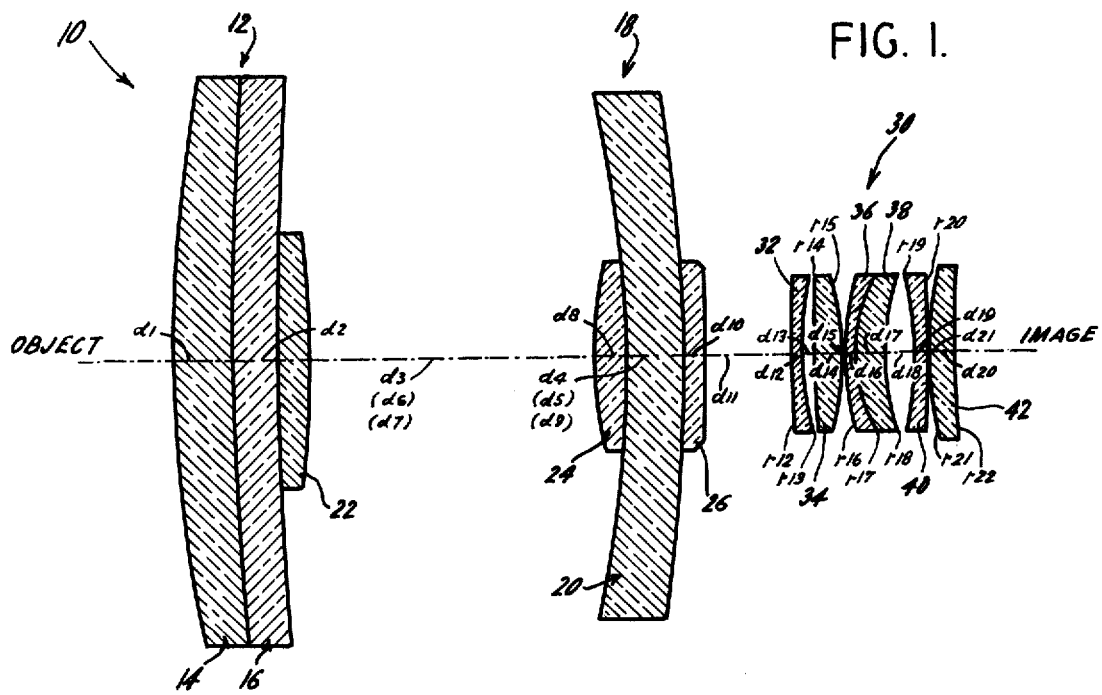
FIGS. 1, 4 and 7 show the lens system of the invention arranged for short focal length and correspond respectively to Examples 1, 2 and 3 discussed below.

In accordance with the invention, a reflecting zoom lens system comprises a first set of lenses having a positive focal length and a second set of lenses having a negative focal length. The first set of lenses is located closer to the object than the second set of lenses and the first and second sets of lenses are displaceable relative to each other to vary the focal length of the whole system and maintain a fixed image field position.

More specifically, the first set of lenses comprises a reflecting lens system, while the second set of lenses comprises a simple transmission lens system, and the first and second sets of lenses satisfy the following conditions:

$$1.2 < Z < 2.0, \quad (1)$$

$$1.5 < f_{min}/f_1 < 3.0, \quad (2)$$

$$0.2 < f_1/f_a < 0.7, \quad (3)$$

$$1.5 < f_1/f_b < 3.0, \quad (4)$$

$$0.3 < f_1/f_c < 1.0, \text{ and} \quad (5)$$

$$0.01 < D_{12}/f_{min} < 0.05, \quad (6)$$

in which
 Z: zoom ratio,
 $f_{min}$: short focal length of the whole system,
 $f_1$: focal length of the first set of lenses,
 $f_a$: focal length of the front group of the first set of lenses,
 $f_b$: focal length between the front group and a first reflecting lens in the first set of lenses,
 $f_c$: focal length between the front group and a second reflecting surface in the first set of lenses, and
 $D_{12}$: distance between the first and second sets of lenses in the short focal length made.

Referring now to the drawings, the first set of lenses 10 comprises the front group 12 consisting of a combination of positive and negative meniscus lenses 14, 16 respectively each having a convex surface facing the object, the positive meniscus lens 14 being closer to the object, and a rear group 18 consisting of a first reflecting lens 20 which is a negative meniscus lens having a concave reflecting surface facing the image, a second reflecting lens 22 attached to the front group 12 and having a convex surface on which an image is reflected, a positive lens 24 attached to the first reflecting lens 20 on its side facing the object, and a negative lens 26 attached to the first reflecting lens on its side facing the image, and the second set of lenses 30 comprises in the order of their closeness to the object a negative lens 32, a positive lens 34, a combination of negative and positive meniscus lenses 36, 38 each having a convex surface facing the object, a negative lens 40 having a concave surface facing the object, and a positive lens 42 having a convex surface facing the object.

Reference will now be made in detail to each of the conditions specified above for the lens system, which conditions represent practical considerations in the design of zoom lens systems but which are not to be taken as limiting the broadest aspects of this invention.

Condition (1) defines the range of the zoom ratio required by this invention. The use of a zoom ratio below the lower limit would result in a low magnification change ratio which diminishes the advantage of the zoom lens. A zoom ratio in excess of the upper limit would bring about a great increase in the amount of displacement of the second set of lenses 30 which would require a long body tube, thereby rendering the construction of the zoom lens less compact.

Conditions (2) to (6) all relate to the arrangement of power. Exceeding the upper limit of Condition (2) can contribute to the compact construction of the zoom lens; however, it brings about an increase in the amount of displacement of the second set of lenses 30 along the entire length of the system, and an increase in the negative power of the second set of lenses 30. This makes it difficult to correct chromatic aberration. While a value of Condition (2) below its lower limit is advantageous for the correction of aberration, it hinders the compact construction of the system.

While exceeding over the upper limit of Condition (3) can contribute to the compact construction of the system, it brings about an excessive increase in the power of the front group 12 of the first set of lenses 10. This disadvantageously increases the residual of chromatic aberration in the total wavelength area, even if colors having two specific wavelengths can successfully be erased. Any value of Condition (3) below its lower limit hinders the compact construction of the system. If the compact construction of the system is still inended, too high a burden is imposed on the first reflecing lens 20 and the second reflecting surface (r7) of rflecting lens 22 in view of Conditions (4) and () below. This makes it difficult to correct aberratin.

Exceeding the upper limit of Condition (4) an contribute to the compact construction of the system; however, it increases the burden on the first reflectin lens 20 to such an extent that coma is difficult to correct. Any value of Condition (4) below its lower limit hinders the compact construction of the system.

While any excess of Condition (5) over its upper limit can contribute to the compact construction of the system, it is impossible to correct satisfactorily any aberration occurring to the first reflecting lens 20. On the other hand, any value of Condition (5) below its lower limit brings about excessive correction of any aberration occurring to the first reflecting lens 20. This increases the burden on the rear group 18 of the first set of lenses 10, and thereby makes it difficult to correct aberration in the first set of lenses 10.

If a value of Condition (6) below its lower limit is used, it is necessary in view of Conditions (1) and (2) to increase the power of the first and second sets of lenses 10, 30 respectively in order to maintain a predetermined zoom ratio. This increases the amount of displacement of the second set of lenses 30, and thereby makes it difficult to correct aberration. An excess of Condition (6) over its upper limit makes it necessary to decrease the positive power of the first set of lenses 10 in order to obtain the back focus as required. This hinders the compact construction of the system.

The invention will now be described with reference to examples shown by numerical data, in which f stands for focal length, ω stands for half image angle, r stands for the radius of curvature, d stands for lens thickness or the distance from the lens surface to the next higher numbered lens surface (i.e., $d_3$ is the distance between surfaces $r_3$ and $r_4$), N stands for a d-line refractive index, and ν stands for Abbe's number.

In the examples below, the numbers in the lefthand column refer generally to surface numbers and the numbers to the right of the surface numbers provide the dimensions and characteristics. Thus, in Example 1, under First Set of Lenses, First Group, the number 1 indicates the surface $r_1$ and the table indicates that $r_1$ equals 189.835 and that $d_1$ (the distance from surface $r_1$ to surface $r_2$) equals 8.00.

EXAMPLE 1

| 1:5.7–8.3 f = 410.0–590.0 ω= 3.0°–2.0° | | | | |
|---|---|---|---|---|
| Front group | r | d | N | ν |
| First set of lenses | | | | |
| 1 | 189.835 | 8.00 | 1.51633 | 64.1 |
| 2 | 1095.063 | 5.50 | 1.74000 | 28.3 |
| 3 | 797.153 | 43.10 | | |
| First reflecting lens | | | | |
| 4 | −135.750 | 7.00 | 1.58913 | 61.0 |
| 5 | −183.050 | −7.00 | −1.58913 | 61.0 |
| 6 | −135.750 | −39.10 | | |
| Second reflecting surface | | | | |
| 7 | −132.760 | 34.60 | | |
| Rear group | | | | |
| 8 | 78.968 | 4.50 | 1.51633 | 64.1 |
| 9 | −135.750 | 7.00 | 1.58913 | 61.0 |
| 10 | −183.050 | 2.50 | 1.80518 | 25.4 |
| 11 | −697.010 | 10.55~3.00 | | |
| Second set of lenses | | | | |
| 12 | 241.129 | 1.35 | 1.83481 | 42.7 |
| 13 | 39.968 | 1.50 | | |
| 14 | 133.398 | 3.60 | 1.67270 | 32.1 |
| 15 | −42.648 | 0.10 | | |
| 16 | 39.283 | 1.50 | 1.83481 | 42.7 |
| 17 | 18.794 | 3.70 | 1.59551 | 39.2 |
| 18 | 38.056 | 4.05 | | |
| 19 | −27.029 | 1.50 | 1.88300 | 40.8 |
| 20 | −157.451 | 0.10 | | |
| 21 | 49.483 | 3.10 | 1.72825 | 28.5 |
| 22 | 171.022 | | | |
| Z = 1.44 | | $f_1/f_b$ = 1.879 | | |
| $f_{min}/f_1$ = 2.206 | | $f_1/f_c$ = 0.641 | | |
| $f_1/f_a$ = 0.375 | | $D_{12}/f_{min}$ = 0.026 | | |

Figure 2:
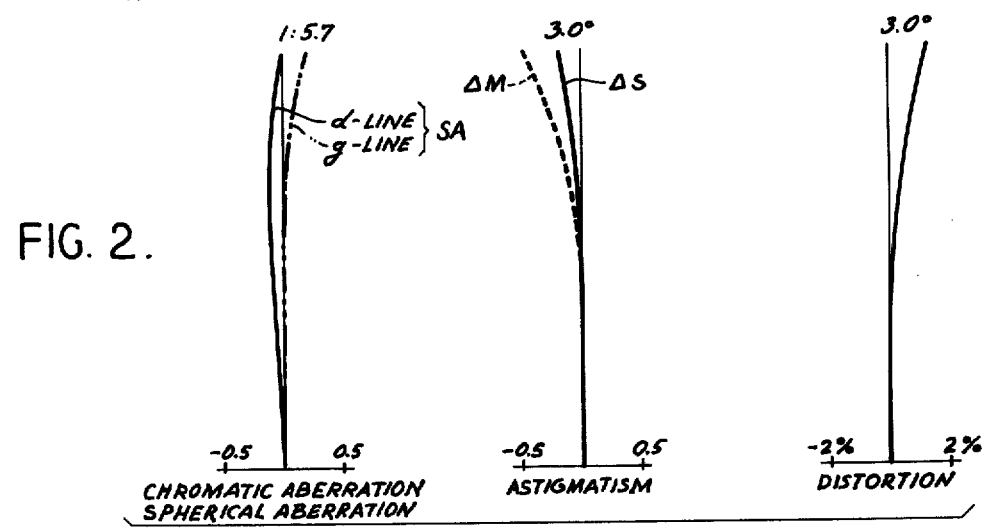
FIGS. 2 and 3 show various kinds of aberrations for the lens system of Example 1 adjusted for the short focal length and long focal length respectively.
Figure 3:
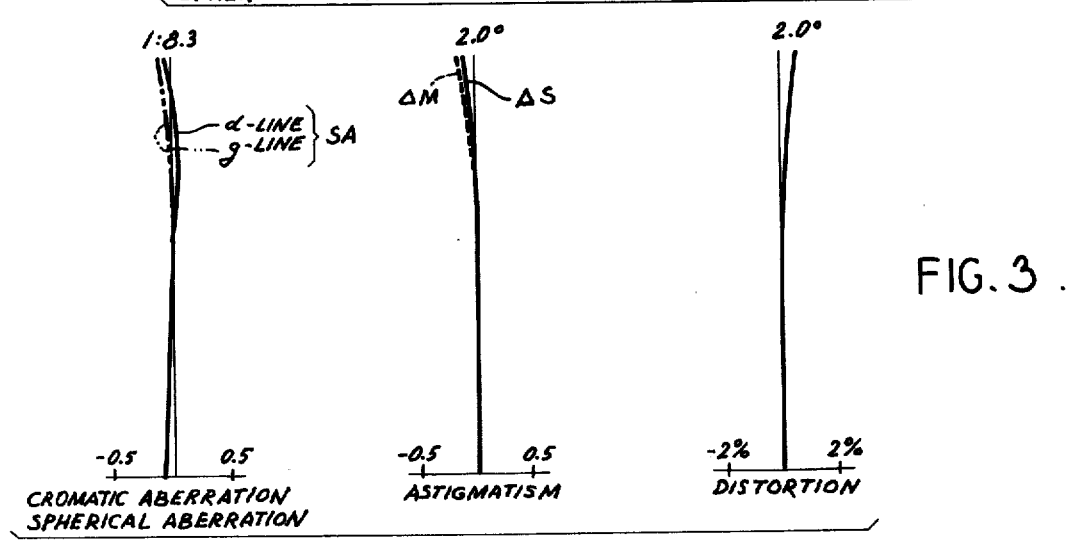
Figure 4:
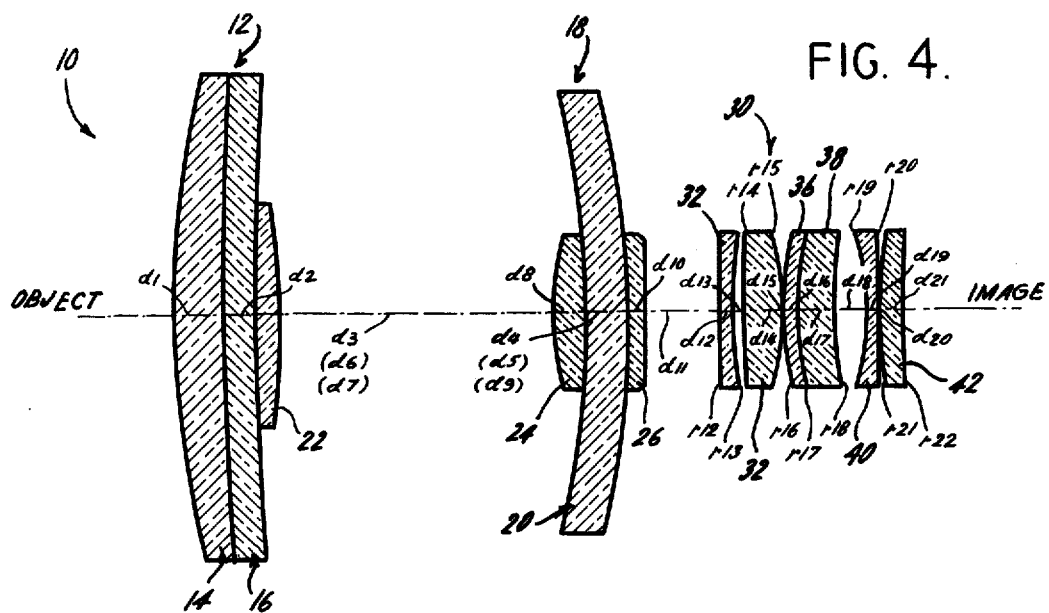

FIG. 2 shows various kinds of aberrations for the lens system of Example 1 with the focal length adjusted to a short focal length of about 400 mm. FIG. 3 shows various kinds of aberrations for the lens system of Example 1 with the focal length adjusted to a long focal length of about 600 mm. In these figures:

d-line indicates yellow light with wavelength of 587.56 mm.

g-line indicates blue light with wavelength of 435.84 mm.

ΔS indicates astygmatism of the saggital direction.

ΔM indicates astygmatism of the meridional direction.

SA indicates spherical aberration.

EXAMPLE 2

| 1:6.8~10.0 f = 410.0~600.0 ω = 3.0°~2.0° | | | | |
|---|---|---|---|---|
| Front group | r | d | N | ν |
| First set of lenses | | | | |
| 1 | 167.183 | 6.00 | 1.58913 | 61.0 |
| 2 | 653.508 | 4.00 | 1.68893 | 31.1 |
| 3 | 434.969 | 41.07 | | |
| First reflecting lens | | | | |
| 4 | −122.802 | 5.00 | 1.58913 | 61.0 |
| 5 | −165.183 | −5.00 | −1.58913 | 61.0 |
| 6 | −122.802 | −38.07 | | |
| Second reflecting lens | | | | |
| 7 | −112.971 | 34.07 | | |
| Rear group | | | | |
| 8 | 62.449 | 4.00 | 1.48749 | 70.1 |
| 9 | −122.802 | 5.00 | 1.58913 | 61.0 |
| 10 | −165.183 | 2.00 | 1.74950 | 35.3 |
| 11 | −865.788 | 9.51~2.98 | | |
| Second set of lenses | | | | |
| 12 | −259.126 | 1.20 | 1.83481 | 42.7 |

-continued

| 1:6.8~10.0 f = 410.0~600.0 ω = 3.0°~2.0° | | | | |
|---|---|---|---|---|
| Front group | r | d | N | ν |
| 13 | 50.479 | 1.35 | | |
| 14 | 145.036 | 4.80 | 1.67270 | 32.1 |
| 15 | −34.734 | 0.20 | | |
| 16 | 48.876 | 1.30 | 1.83481 | 42.7 |
| 17 | 26.518 | 4.30 | 1.60342 | 38.0 |
| 18 | 51.418 | 4.83 | | |
| 19 | −24.241 | 1.30 | 1.88300 | 40.8 |
| 20 | −284.132 | 0.10 | | |
| 21 | 56.983 | 3.10 | 1.72825 | 28.5 |
| 22 | 194.929 | | | |
| Z = 1.46 | | $f_1/f_b$ = 1.973 | | |
| $f_{min}/f_1$ = 2.295 | | $f_1/f_c$ = 0.576 | | |
| $f_1/f_a$ = 0.380 | | $D_{12}/f_{min}$ = 0.023 | | |

Figure 5:
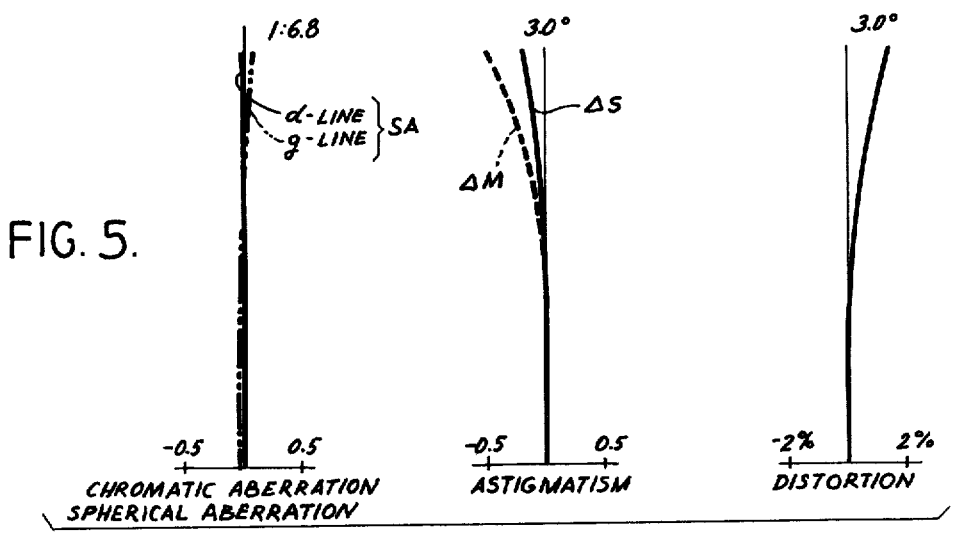
FIGS. 5 and 6 show various kinds of aberrations for the lens system of Example 2 adjusted for the short focal length and long focal length respectively.
Figure 6:
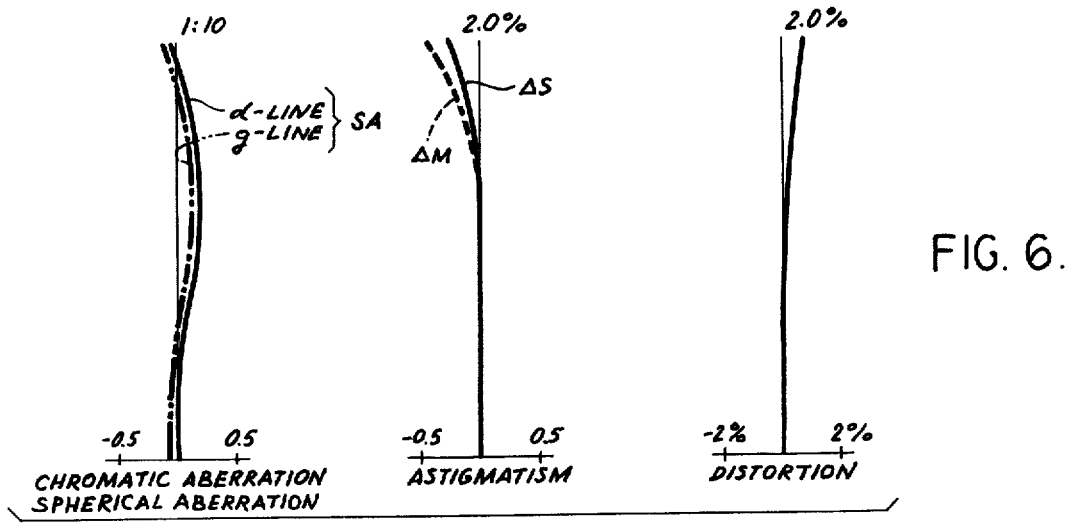
Figure 7:
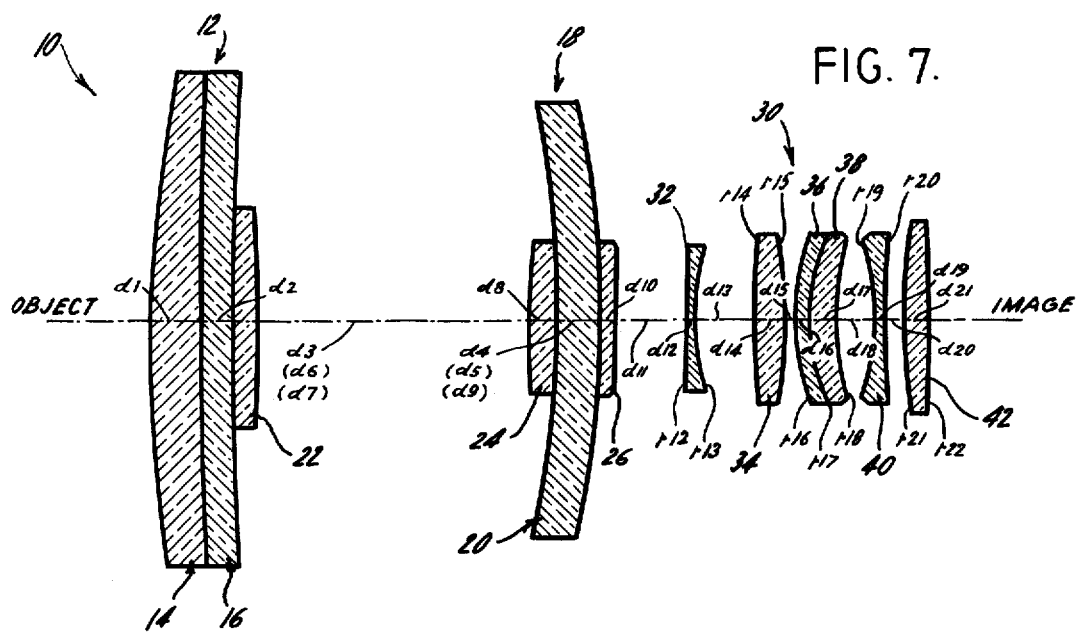

FIGS. 5 and 6 show various kinds of aberrations for the lens system of Example 2 and correspond respectively to FIGS. 2 and 3.

EXAMPLE 3

| 1:6.8~9.9 f = 410~595.0 ω = 3.0°~2.0° | | | | |
|---|---|---|---|---|
| Front group | r | d | N | ν |
| First set of lenses | | | | |
| 1 | 195.347 | 6.00 | 1.58913 | 61.0 |
| 2 | 1878.325 | 4.00 | 1.67270 | 32.1 |
| 3 | 902.532 | 40.68 | | |
| First reflecting lens | | | | |
| 4 | −125.529 | 5.00 | 1.58913 | 61.0 |
| 5 | −165.680 | −5.00 | −1.58913 | 61.0 |
| 6 | −125.529 | −37.68 | | |
| Second reflecting surface | | | | |
| 7 | −106.757 | 33.68 | | |
| Rear group | | | | |
| 8 | 72.627 | 4.00 | 1.58913 | 61.0 |
| 9 | −125.529 | 5.00 | 1.58913 | 61.0 |
| 10 | −165.680 | 2.00 | 1.80518 | 25.4 |
| 11 | −2551.194 | 9.13~2.99 | | |
| Second set of lenses | | | | |
| 12 | −264.767 | 1.35 | 1.80610 | 40.9 |
| 13 | 47.133 | 7.31 | | |
| 14 | 75.981 | 4.30 | 1.59270 | 35.3 |
| 15 | −35.757 | 1.04 | | |
| 16 | 46.861 | 1.50 | 1.80610 | 40.9 |
| 17 | 22.615 | 3.80 | 1.60342 | 38.0 |
| 18 | 51.727 | 4.31 | | |
| 19 | −24.569 | 1.50 | 1.83400 | 37.2 |
| 20 | 80.805 | 1.72 | | |
| 21 | 56.044 | 3.40 | 1.80518 | 25.4 |
| 22 | −245.054 | | | |
| Z = 1.45 | | $f_1/f_b$ = 1.998 | | |
| $f_{min}/f_1$ = 2.323 | | $f_1/f_c$ = 0.618 | | |
| $f_1/f_a$ = 0.410 | | $D_{12}/f_{min}$ = 0.022 | | |

Figure 8:
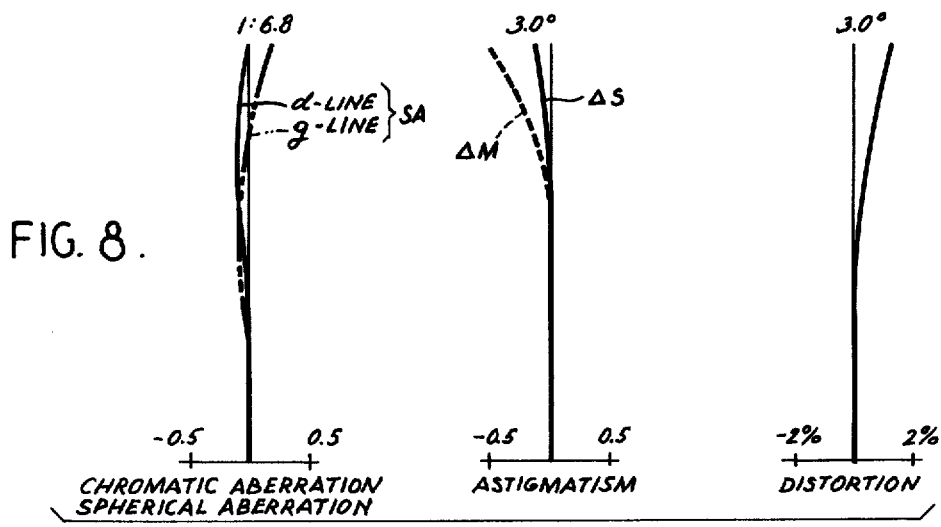
FIGS. 8 and 9 show various kinds of aberrations for the lens system of Example 3 adjusted for the short focal length and long focal length respectively.
Figure 9:
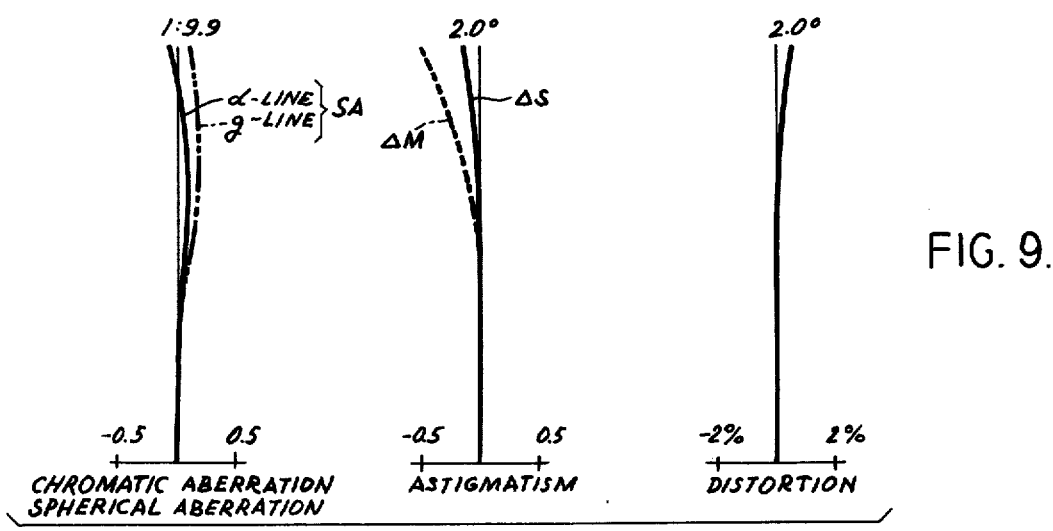

FIGS. 8 and 9 show various kinds of aberrations for the lens system of Example 3 and correspond respectively to FIGS. 2 and 3.

The invention has been described with reference to general operational characteristics and specific examples. The invention is not to be limited thereby. Such description provides guidance as to the operation and construction of the zoom lens system of the invention but a worker skilled in the art will understand that modifications and adjustments can be made, particularly with respect to the specified operation conditions, while constructing a zoom lens system which comes within the scope of the invention which is set forth in the claims.

What I claim is:

1. A reflecting telephoto zoom lens system comprising a first lens group having a positive focal length and a second lens group having a negative focal length, said first lens group being located closer to the object than said second lens group, said first lens group being a reflecting lens system with main and auxiliary mirrors, said second lens group being a transmission lens system, said first and said second lens groups being translatable along an optical axis for varying the focal length of the entire optical system while maintaining a fixed image field position.

2. A reflecting telephoto zoom lens system as set forth in claim 1, wherein said first lens group includes a front lens group consisting of a combination of positive and negative meniscus lenses, each having a convex surface facing the object with said positive meniscus lens being closer to the object, and a rear group consisting of a first reflecting lens which is a negative meniscus lens having a concave reflecting surface facing the image, a second reflecting lens attached to said front lens group and having a convex surface on which an image is reflected, a positive lens attached to said first reflecting lens on its side facing the object, and a negative lens attached to said first reflecting lens on its side facing the image.

3. A reflecting telephoto zoom lens system as set forth in claim 1, wherein power variation of the system is accomplished by said second lens group.

4. A reflecting telephoto zoom lens system comprising a first lens group having a positive focal length and a second lens group having a negative focal length, said first lens group being located closer to the object than said second lens group, said first lens group being a reflecting lens system with main and auxiliary mirrors, the air gap between said main and said auxiliary mirrors being kept constant, said second lens group being a transmission lens system, said first and said second lens groups being translatable along an optical axis for varying the focal length of the entire optical system while maintaining a fixed image field position.

5. A zoom lens system comprising a first set of lenses having a positive focal length and a second set of lenses having a negative focal length, said first set of lenses being located closer to the object than said second set of lenses, said first and second sets of lenses being displaceable relative to each other to vary the focal length of the whole system and maintain a fixed image field position, said first set of lenses comprising a reflecting lens system, while said second set of lenses comprises a transmission lens system, said first and second sets of lenses satisfy the following conditions:

$$1.2 < Z < 2.0, \tag{1}$$

$$1.5 < f_{min}/f_1 < 3.0, \tag{2}$$

$$0.2 < f_1/f_a < 0.7, \tag{3}$$

$$1.5 < f_1/f_b < 3.0, \tag{4}$$

$$0.3 < f_1/f_c < 1.0, \text{ and} \tag{5}$$

$$0.01 < D_{12}/f_{min} < 0.05 \tag{6}$$

in which
Z: zoom ratio,
$f_{min}$: focal length of the whole system on the short focus side, $f_1$: focal length of said first set of lenses, $f_a$: local length of the front group of said first set of lenses, $f_b$: focal length between said front group and a first reflecting lens in said first set of lenses, $f_c$: focal length between said front group and a second reflecting surface in said first set of lenses, and $D_{12}$: distance between said first and second sets of lenses on the short focus side.

6. A zoom lens system as set forth in claim 5, wherein the first set of lenses includes a front group consisting of a combination of positive and negative meniscus lenses each having a convex surface facing the object with said positive meniscus lens being closer to the object, and a rear group consisting of a first reflecting lens which is a negative meniscus lens having a concave reflecting surface facing the image, a second reflecting lens attached to said front group and having a convex surface on which an image is reflected, a positive lens attached to said first reflecting lens on its side facing the object, and a negative lens attached to said first reflecting lens on its side facing the image, and said second set of lenses comprises in the order of their closeness to the object a negative lens, a positive lens, a combination of negative and positive meniscus lens each having a convex surface facing the object, a negative lens having a concave surface facing the object, and a positive lens having a convex surface facing the object.

* * * * *